United States Patent [19]
Okazaki et al.

[11] Patent Number: 5,896,364
[45] Date of Patent: Apr. 20, 1999

[54] OPTICAL RECORDING MEDIUM HAVING BOTH SERIAL DATA AND RANDOM DATA RECORDING AREAS

[75] Inventors: Yukinori Okazaki, Hirakata; Yoshimitsu Nakamura, Neyagawa, both of Japan

[73] Assignee: Matsushita Electric Industrial Co., Ltd., Osaka, Japan

[21] Appl. No.: 08/553,151

[22] Filed: Nov. 7, 1995

[30] Foreign Application Priority Data

Nov. 8, 1994 [JP] Japan .................. 6-273548

[51] Int. Cl.$^6$ .................................................. G11B 7/24
[52] U.S. Cl. .................................. 369/275.3; 369/58
[58] Field of Search .................... 369/275.3, 58, 369/275.2, 44.26, 272, 273, 274, 47, 48; 386/126

[56] References Cited

U.S. PATENT DOCUMENTS

| | | | |
|---|---|---|---|
| 5,373,498 | 12/1994 | Tagiri | 369/275.3 |
| 5,420,839 | 5/1995 | Tateishi | 369/32 |
| 5,740,151 | 4/1998 | Koh | 369/275.3 |
| 5,757,752 | 5/1998 | Sako | 369/275.3 |
| 5,778,257 | 7/1998 | Tsukatani et al. | 369/275.3 |

*Primary Examiner*—Tan Dinh
*Attorney, Agent, or Firm*—Ratner & Prestia

[57] ABSTRACT

A random data recording area and a serial data recording area are placed in a radial direction on the same surface of a zoned constant angular velocity disk. The random data recording area is located at an inner circumference of the disk, while the serial data recording area is located at an outer circumference of the disk. The random data recording area consists of a rewritable random data recording area and a read-only random data recording area, wherein the read-only random data recording area is placed at an inner circumference of the disk. The serial data recording area consists of a rewritable serial data recording area and a read-only serial data recording area, wherein the read-only serial data recording area is placed at an outer circumference of the disk.

33 Claims, 5 Drawing Sheets

OPTICAL RECORDING MEDIUM HAVING BOTH SERIAL DATA AND RANDOM DATA RECORDING AREAS

FIELD OF THE INVENTION

The present invention relates to disk shape information recording media such as opto-magnetic disk, phase change type optical disk, etc., information recording methods for recording information on disk shape information recording media and information recording apparatus for implementing said information recording methods.

BACKGROUND OF THE INVENTION

Among the information recording media, there have been a recording medium suitable for recording serial data, for example a magnetic tape or a compact disk(CD), which is ideal for recording continuous data like sound, picture, etc., and a recording medium suitable for recording random data used for computer peripherals such as a floppy disk device and a magnetic hard disk device (hereinafter referred to as HDD); in both types of the media, the recording format is already set to be suitable for either one of the recording conditions, namely, recording of serial data or recording of random data.

In the mean time, as a result of progress in information processing capability of computers, sound and picture information are increasingly handled together with various other data. In such occasions, namely in an environment so called multimedia where sound and picture information and various other data are handled mixed, CD-ROMs and HDDs have been frequently used as information recording media.

However, when serial data like sound and picture are recorded on an HDD which is suitable for recording random data, the data that should be continuous are often splitted and placed scattered on a disk as a result of the error sector replacement or by an action of the operating system used, causing interrupted sound/picture during data reproduction, although the device has an advantage in executing recovery of data error or failure of a disk, or in information search capability.

On the other hand, in a CD-ROM, which is suitable for recording serial data, the continuity of data is assured because of the format structure, however the medium takes time in seaching of random data contained in the multimedia information.

The present invention intends to prevent the deterioration of performance that should arise when recording random data on an above mentioned conventional recording medium which is intrinsically suitable to record serial data or when recording serial data on a recording medium which is suitable to record random data, and to maintain the continuity of data by providing serial data with a recording format that is suitable to serial data, as well as to shorten the access time by providing random data with a recording format that is suitable to random data; thereby offering an information recording medium, an information recording method and an information recording apparatus that implements these two kinds of data simultaneously on one recording medium.

SUMMARY OF THE INVENTION

An information recording medium as described in claim 1 of the present invention features in that there are random data recording area for recording random data and serial data recording area for recording serial data on the same surface of a disk.

An information recording medium as described in claim 2 features in that in an information recording medium according to claim 1 the ZCAV (Zoned Constant Angular Velocity) disk structure is adopted, wherein the random data recording area is located at an inner circumference of a disk, while the serial data recording area is located at an outer circumference of a disk.

An information recording medium as described in claim 3 features in that in an information recording medium according to claim 2 the random data recording area is consisting of a rewritable random data recording area and a read-only random data recording area, wherein the read-only random data recording area is located at an inner circumference of a disk.

An information recording medium as described in claim 4 features in that in an information recording medium according to claim 2 the serial data recording area is consisting of a rewritable serial data recording area and a read-only serial data recording area, wherein the read-only serial data recording area is located at an outer circumference of a disk.

An information recording medium as described in claim 5 features in that in an information recording medium according to claim 1 the random data recording area is set to a logic format in accordance with the logic specification of a computer or a host system on which the medium is used; and the serial data recording area is set to a specific logic format, not in accordance with the logic specification of a computer or a host system.

An information recording medium as described in either claim 6, 7 or 8 features in that in an information recording medium according to claim 1, 4 or 5 a format definition area for recording format definition information which allocates locations for the random data recording area and the serial data recording area on a disk surface is located at a specified location on a disk surface.

An information recording medium as described in claim 9 features in that in an information recording medium according to claim 6, 7 or 8 the specified location for format definition area is placed at least in one of the locations either at the outermost circumference or the innermost circumference of a disk surface.

An information recording medium as described in claim 10 features in that in an information recording medium according to claim 1 a continuous address is recorded on a disk starting from the outer circumference to the inner circumference of a disk, and the random data recording area and the serial data recording area are provided with a same physical address structure, sector structure and physical format, wherein an area is divided into the random data recording area and the serial data recording area by the logic formatting to be conducted at the beginning when a disk is put on service.

An information recording medium as described in claim 11 features in that in an information recording medium according to claim 1 the rewritable random data recording area of the random data recording area is provided with a spare area in an area other than user data area, whereas the serial data recording area as well as the read-only random data recording area of the random data recording area are provided with a parity sector immediately after a certain number of sectors.

An information recording medium as described in claim 12 features in that in an information recording medium according to claim 11 the random data recording area is set to a logic format in accordance with the logic specification of a computer or a host system on which the medium is used; whereas the serial data recording area is set to a specific logic format, not in accordance with the logic specification of a computer or a host system.

An information recording medium as described in claim 13 features in that in an information recording medium according to claim 12 a format definition area for recording format definition information which allocates locations for the random data recording area and the serial data recording area on a disk surface is provided in a specified location on a disk surface.

An information recording medium as described in claim 14 features in that in an information recording medium according to claim 13 the specified location for format definition area is at least in one of the locations either at the outermost circumference or the innermost circumference of a disk surface.

An information recording medium as described in claim 15 features in that in an information recording medium according to claim 14 the random data recording area is located at an inner circumference of a disk, while the serial data recording area is located at an outer circumference of a disk.

An information recording medium as described in claim 16 features in that in an information recording medium according to claim 15 the random data recording area is consisting of a rewritable random data recording area and a read-only random data recording area, wherein the read-only random data recording area is located at an inner circumference of a disk.

An information recording medium as described in claim 17 features in that in an information recording medium according to claim 15 the serial data recording area is consisting of a rewritable serial data recording area and a read-only serial data recording area, wherein the read-only serial data recording area is located at an outer circumference of a disk.

An information recording medium as described in claim 18 features in that in an information recording medium according to claim 15 a continuous address is recorded on a disk starting from the outer circumference to the inner circumference of a disk, and the random data recording area and the serial data recording area are provided with a same physical address structure, sector structure and physical format, wherein an area is divided into the random data recording area and the serial data recording area by the logic formatting to be conducted at the beginning when a disk is put on service.

An information recording medium as described in claim 19 features in that in an information recording medium according to either claim 15, 16, 17 or 18 the ZCAV disk structure is adopted.

An information recording medium as described in claim 20 features in that in an information recording medium according to claim 14 the random data recording area is located at an outer circumference of a disk, while the serial data recording area is located at an inner circumference of a disk.

An information recording medium as described in claim 21 features in that in an information recording medium according to claim 20 the random data recording area is consisting of a rewritable random data recording area and a read-only random data recording area, wherein the read-only random data recording area is located at an outer circumference of a disk.

An information recording medium as described in claim 22 features in that in an information recording medium according to claim 20 the serial data recording area is consisting of a rewritable serial data recording area and a read-only serial data recording area, wherein the read-only serial data recording area is located at an inner circumference of a disk.

An information recording medium as described in claim 23 features in that in an information recording medium according to claim 20 a continuous address is recorded on a disk starting from the inner circumference to the outer circumference of a disk, and the random data recording area and the serial data recording area are provided with a same physical address structure, sector structure and physical format, wherein an area is divided into the random data recording area and the serial data recording area by the logic formatting to be conducted at the beginning when a disk is put on service.

An information recording medium as described in claim 24 features in that in an information recording medium according to either claim 20, 21, 22 or 23 the ZCAV disk structure is adopted.

An information recording method as described in claim 25 features in that the random data and the serial data are recorded separately in respective recording areas on a same surface of a disk.

An information recording method as described in claim 26 features in that in an information recording method according to claim 25 a ZCAV disk is used, wherein the random data are recorded in an inner circumference of a disk, while the serial data are recorded in an outer circumference of a disk.

An information recording method as described in claim 27 features in that in an information recording method according to claim 25 the random data are recorded in accordance with a logic format which is in line with the logic specification of a computer or a host system on which the data are processed; whereas the serial data are recorded in accordance with a specific format, not according to the logic specification of a computer or a host system.

An information recording method as described in claim 28 features in that in an information recording method according to claim 25 a format definition information for allocating the random data recording area and the serial data recording area on a disk surface is recorded at a specified location on a disk surface.

An information recording method as described in claim 29 features in that in an information recording method according to claim 28 the specified location for recording a format definition information is placed at least in one of the locations either at the outermost circumference or the innermost circumference of a disk.

An information recording method as described in claim 30 features in that in an information recording method according to claim 25, for the rewritable random data recording area of the random data recording area, an error sector during recording or by the verify operation is detected and the error sector is replaced utilizing a spare sector placed in a location separated from the error sector, whereas for the serial data recording area as well as the read-only random data recording area of the random data recording area, execute the error recovery against an error sector is executed during reading utilizing a parity sector placed immediately after a certain number of sectors on a disk.

An information recording method as described in claim 31 features in that in an information recording method according to claim 30 the random data are recorded in accordance with a logic format which is in line with the logic specification of a computer or a host system on which the data are processed; while the serial data are recorded according to a specific logic format, not in accordance with the logic specification of a computer or a host system.

An information recording method as described in claim 32 features in that in an information recording method according to claim 31 a format definition information for allocating the random data recording area and the serial data recording area on a disk surface is recorded at a specified location on a disk surface.

An information recording method as described in claim 33 features in that in an information recording method according to claim 32 the specified location for recording the format definition information is placed at least in one of the locations either at the outermost circumference or the innermost circumference of a disk surface.

An information recording method as described in claim 34 features in that in an information recording method according to claim 33 the random data are recorded in an inner circumference of a disk, while the serial data are recorded in an outer circumference of a disk.

An information recording method as described in claim 35 features in that in an information recording method according to claim 34 a ZCAV disk is used.

An information recording method as described in claim 36 features in that in an information recording method according to claim 33 the random data are recorded in an outer circumference of a disk, while the serial data are recorded in an inner circumference of a disk.

An information recording method as described in claim 37 features in that in an information recording method according to claim 36 a ZCAV disk is used.

An information recording apparatus as described in claim 38 comprises

- a disk detection means for detecting whether a disk is inserted in an optical disk apparatus;
- a disk start-up means for starting a disk in response to an output of the disk detection means;
- a format definition information reproduction means for reproducing format definition area information of a disk;
- a read/write instruction detection means for detecting read/write instruction;
- a read/write area judgment means for judging whether a read/write area is the rewritable random data area or the other data area, based on an address contained in a read/write instruction detected by the read/write instruction detection means and the format definition area information of a disk;
- an error sector treatment means for treating, based on an output of the read/write area judgment means, an error sector by replacing the sector if the read/write area concerned is a rewritable random data area, and treating an error sector by the parity sector if the read/write area concerned is an other area; and
- a disk ejection means for ejecting a disk out of an optical disk apparatus upon detecting a disk ejection instruction.

With a constitution as described in claim 1, the present invention prevents the occurrence of deterioration in performance that should arise when recording random data on a conventional recording medium which is intrinsically suitable to record serial data or when recording serial data on a recording medium which is suitable to record random data; maintains the continuity of data by providing serial data with a recording form that is suitable to serial data; shortens the access time by providing random data with a recording form that is suitable to random data; provides a sufficient function to recover data error, failure on a disk; and makes it possible to implement the coexistence of two kinds of data at a same time on one recording medium, which constitution is most suitable to the multimedia environment where the random data and the serial data are contained mixed.

With a constitution as described in claim 2, in a case when a ZCAV disk is used, a high speed data transmission is implemented because of the higher data transmission rate at the outer circumference of a disk where serial data are recorded; thus the real time performance and or the continuity is secured in the write/read processing of serial data, where a faster transmission rate is requested.

With a constitution as described in claim 3, an information for searching information stored in a read-only random data recording area is often recorded in the rewritable random data recording area which is placed at an outer circumference; which helps implement a high speed information search. The access to read-only random data recording area is quickly performed, and the computer data and other random data pre-recorded in a disk are rapidly read out insuring the quick start up of a computer and a host system.

With a constitution as described in claim 4, the speed of data transmission rate in a read-only serial data recording area is increased, and the picture, sound and other serial data recorded in a disk are read out at a higher speed.

With a constitution as described in claim 5, the compliance to various computers and host systems having different operation systems of their own can be realized by modifying only the logic format of random data recording area, without necessitating modification of the logic format of serial data recording area; thus the development to various computers and host systems is easy using a same serial data.

With a constitution as described in either claim 6, 7 or 8, the random data recording area and the serial data recording area can be allocated at free choice by a format definition information; the allocation of random data recording area and serial data recording area can be changed through modification of the format definition information.

With a constitution as described in claim 9, a format definition area is placed at least in one of the locations either at the outermost circumference or the innermost circumference of a disk, therefore the format definition information which is necessary at the time when a disk is started can be searched quickly, and the write/read processing of data is simplified as the format definition information, serial data and random data are not placed mixed.

With a constitution as described in claim 10, an area is divided into a random data recording area and a serial data recording area by the logic formatting to be conducted at the beginning when a disk is put on service; that is, a disk surface can be allocated at free choice into a random data recording area and a serial data recording area, therefore disks of a same type may be used for various dividing needs by modifying only the logic formatting.

With a constitution as described in claim 11, the reliability is assured with respect to random data and the continuity is secured with respect to serial data by, in a case of the rewritable random data recording area, detecting an error sector during writing or by the verify operation to replace the error sector utilizing a spare sector placed in a location separated from the error sector; and by conducting the error recovery during readout utilizing a parity sector placed immediately after a certain number of sectors on a disk, in a case of the serial data recording area and the read-only random data recording area.

With a constitution as described in claim 12, in addition to the functions derived from claim 11, the development to various computers and host systems turns out to be easier using a same serial data because of an advantage that the compliance to various other computers and host systems having different operation systems of their own can be realized by modifying only the logic format of random data recording area, without necessitating modification of the logic format of serial data recording area.

With a constitution as described in claim 13, in addition to the functions derived from claim 12, the random data recording area and the serial data recording area can be freely allocated by a format definition information; the allocation of random data recording area and serial data recording area can be changed by modifying the format definition information.

With a constitution as described in claim 14, in addition to the functions derived from claim 13, a format definition area is placed at least in one of the locations either at the outermost circumference or the innermost circumference of a disk, therefore the format definition information which is necessary for starting a disk can be searched quickly, and the write/read processing of data is simplified as the format definition information, serial data and random data are not placed mixed.

With a constitution as described in claim 15, in addition to the functions derived from claim 14, the handling as viewed from a host computer is simplified because the outline recording location is fixed: the serial data at an outer circumference and the random data at an inner circumference of a disk.

With a constitution as described in claim 16, in addition to the functions derived from claim 15, the allocation between areas for random data and serial data can be set at free choice because the read-only random data is never placed between random data and serial data; which enables a most efficient use of a disk suitable to the way of application.

With a constitution as described in claim 17, in addition to the functions derived from claim 15, the allocation between areas for random data and serial data can be set at free choice because the read-only serial data is never placed between random data and serial data; which enables a most efficient use of a disk suitable for the way of application.

With a constitution as described in claim 18, in addition to the functions derived from claim 15, an area is divided into the random data recording area and the serial data recording area by the logic formatting to be conducted at the beginning when a disk is put on service, and a disk surface can be freely allocated to random data recording area and serial data recording area; which means that disks of a same type may be used in various area proportions by only modifying the logic format processing.

With a constitution as described in claim 19, in addition to the functions derived from claim 15, 16, 17 or 18, the rate of data transmission at an outer circumference of a disk goes higher, as a result of adoption of a ZCAV disk, than that with respect to other disk types; which enables serial data recording area containing serial data to make a high speed data transmission, thus the real time performance and or the continuity is secured with the read/write processing of serial data where a higher transmission rate is requested. Furthermore, because the information for searching an information provided in the read-only random data recording area is often recorded in the rewritable random data recording area which is placed at an outer circumference, the read out of an information under search is conducted at a higher rate, the access to read-only random data recording area is quickly executed and computer data and other random data prerecorded in a disk can be promptly read out.

With a constitution as described in claim 20, in addition to the functions derived from claim 14, the handling as viewed from a host computer is simplified because the outline recording location is fixed: the serial data at an inner circumference and the random data at an outer circumference of a disk.

With a constitution as described in claim 21, in addition to the functions derived from claim 20, the allocation between the areas for random data and serial data can be set at free choice because the read-only random data are never placed between random data and serial data; which enables a most efficient use of a disk suitable for the way of application.

With a constitution as described in claim 22, in addition to the functions derived from claim 20, the allocation between the areas for random data and serial data can be set at free choice because the read-only serial data are never placed between random data and serial data; which enables a most efficient use of a disk suitable for the way of application.

With a constitution as described in claim 23, in addition to the functions derived from claim 20, an area is divided into the random data recording area and the serial data recording area by the logic formatting to be conducted at the beginning when a disk is put on service, and a disk surface can be freely divided to a random data recording area and a serial data recording area, therefore disks of a same type can be used for various area dividing needs by modifying only the logic formatting.

With a constitution as described in claim 24, in addition to the functions derived from claim 20, 21, 22, or 23, the rate of data transmission at an outer circumference of a disk goes higher, as a result of the adoption of a ZCAV disk, as compared with that with other disk types; which is an advantage when the serial data is a sound information and the degree of request for the speed is higher with respect to random data than that with serial data.

With a method as described in claim 25, the random data are recorded in a form suitable to random data, and the information search function or the recovery function against error of a disk and data error are sufficiently provided; while the continuity of data is secured for serial data by providing a recording form suitable to serial data.

With a method as described in claim 26, the outer circumference of a ZCAV disk, which records serial data, enables a high speed data transmission; therefore it turns out easier to secure the real time performance and or the continuity in write/read processing of serial data.

With a method as described in claim 27, the compliance to various computers and host systems having different operation systems of their own can be realized by only modifying the logic format of random data recording area, without necessitating modification of the logic format of serial data recording area; thus the development to various other computers and host systems turns out to be easy using a same serial data.

With a method as described in claim 28, the random data recording area and the serial data recording area can be freely allocated by a format definition information, therefore the allocation of a random data recording area and a serial data recording area can be changed by the modification of format definition information.

With a method as described in claim 29, a format definition information which is needed at the time when a disk is started can be searched promptly, furthermore the format definition information, serial data and random data are not placed mixed, and the write/read processing of data can be simplified.

With a method as described in claim 30, the random data are secured with their reliability, while the serial data are secured with their continuity.

With a method as described in claim 31, in addition to the functions derived from claim 30, the compliance to various computers and host systems having different operation systems of their own can be realized by only modifying the logic format of random data recording area, without necessitating the modification of the logic format of serial data recording area; thus the development to various other computers and host systems turns out to be easy using a same serial data.

With a method as described in claim 32, in addition to the functions derived from claim 31, the random data recording area and the serial data recording area can be freely allocated by a format definition information, therefore the allocation of a random data recording area and a serial data recording area can be changed by the modification of format definition information.

With a method as described in claim 33, in addition to the functions derived from claim 32, the format definition information which is necessary at the time when a disk is started can be searched promptly because the format definition area is placed at least in one of the locations either at the outermost circumference or the innermost circumference of a disk, and the format definition information, serial data and random data are not placed mixed, so the write/read processing of data can be simplified.

With a method as described in claim 34, in addition to the functions derived from claim 33, the handling as viewed from a host computer is simplified because the outline recording location is fixed: the serial data at an outer circumference and the random data at an inner circumference of a disk.

With a method as described in claim 35, in addition to the functions derived from claim 34, the rate of data transmission at an outer circumference of a disk goes higher, as a result of the adoption of a ZCAV disk, than that with respect to other disk types; which enables serial data recording area containing a serial data to make a high speed data transmission, thus the real time performance and or the continuity of data is secured with the write/read processing of serial data where a higher transmission rate is requested. Furthermore, because the information for searching an information provided in the read-only random data recording area is often recorded in the rewritable random data recording area which is placed at an outer circumference the readout of an information under search is conducted at a higher speed, the access to read-only random data recording area is quickly executed and computer data and other random data prerecorded in a disk can be promptly read out.

With a method as described in claim 36, in addition to the functions derived from claim 33, the handling as viewed from a host computer is simplified because the outline recording location is fixed: the serial data at an outer circumference and the random data at an inner circumference of a disk.

With a method as described in claim 37, in addition to the functions derived from claim 36, the rate of data transmission at an outer circumference of a disk goes higher, as a result of the adoption of a ZCAV disk, as compared with that with other disk types; which is an advantage when the serial data is a sound information and the degree of request for the speed is higher with respect to random data than that with serial data.

With a constitution as described in claim 38, an error sector is replaced by utilizing a spare sector if the read/write area is a rewritable random data area, whereas if the read/write area belongs to other area types the error sector is processed by a parity sector; in this way both the reliability with random data and the high speed with serial data are secured at the same time.

In this way, the occurrence of deterioration of performance that should arise when recording random data on a conventional recording medium which is intrinsically suitable to record serial data or when recording serial data on a recording medium which is suitable to record random data is prevented, the continuity of data is maintained by providing serial data with a recording form that is suitable to serial data and the access time is shortened by providing random data with a recording form that is suitable to random data, and data of two different kinds can coexist on one recording medium. The present invention thus offers an information recording medium, an information recording method and an information recording apparatus most suitable to the multimedia environment where random data and serial data are contained mixed.

DETAILED DESCRIPTION OF THE EMBODIMENTS

An information recording medium according to an embodiment of the present invention is described hereunder based on FIGS. 1, 2, 3 and 5.

Figure 1:
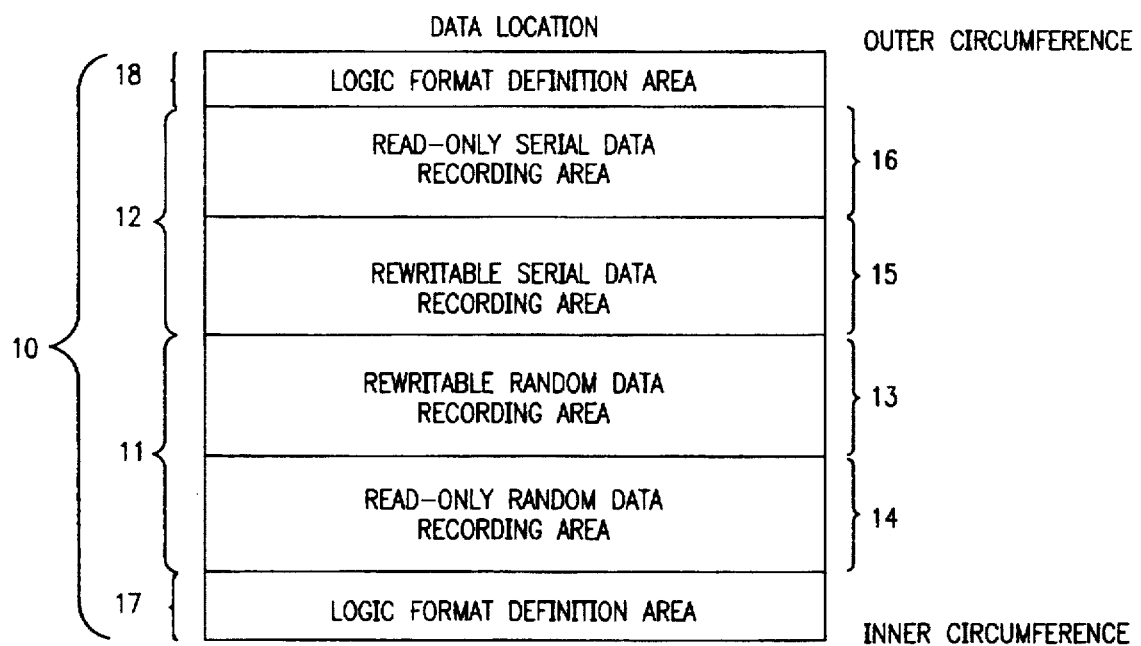
FIG. 1 Conceptual drawing showing the allocation of serial data and random data on information recording medium according to a first embodiment and a third embodiment of the present invention.
Figure 5:
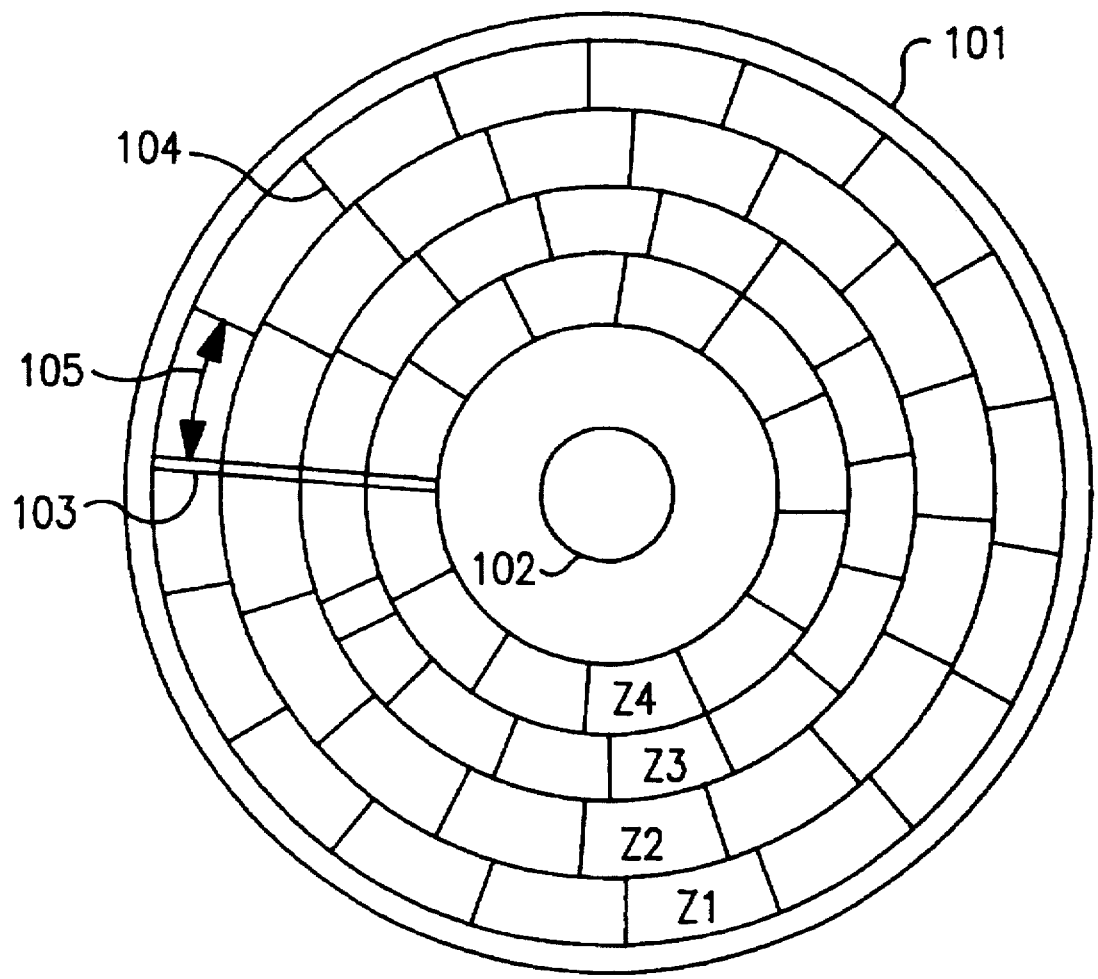
FIG. 5 Outline drawing showing typical structure of ZCAV disk.

FIG. 1 illustrates a typical information positioning in the direction of radius on an opto-magnetic disk, phase change type optical disk, etc. driven by the zoned constant angular velocity (ZCAV) method, where the bottom part corresponds to the inner circumference of a disk while the top part corresponds to the outer circumference. In the ZCAV method, disk revolves at a fixed number of revolutions, surface of which is splitted in the radius direction into plural zones; within a same zone the number of sectors remains the same, and the number of sectors increases in the zones positioned at an outer circumference of a disk. By constituting the format in this way, the recording density is maintained almost even over the whole surface of a disk. FIG. 5 illustrates outline of a typical ZCAV disk, where a disk 101 is provided with a center hole 102 for the disk to be revolved on an apparatus, and in recording areas Z1–Z4 for the users to record their information, a fine track(s) for recording information and the addresses 103, 104, etc. for indicating the position and the angle of the track (not illustrated) are provided beforehand spirally or in concentric circles at a pitch of about / micro meter in a form off and on of each track, etc. In FIG. 5, the recording area is splitted into four zones, Z1–Z4, and the length 105 of each of the sectors is made almost the same over the whole disk by providing the more number of sectors in zones located at an outer circumference. The information are recorded within each sector in a form of a line of pits having optical variation given by means of intensity modulation of laser, etc. Although only four zones and twelve to eighteen sectors are drawn in FIG. 5, practical disks have more number of zones and sectors.

As shown in FIG. 1, this information recording medium logically defines on a surface of disk 10 a random data recording area 11 for recording random data like a computer data with which the random access performance is important and a serial data recording area 12 for recording serial data like picture/sound with which the real time performance and or the continuity is required.

Random data, because it is recorded in, and retrieved from, areas of the disk which are not necessarily contiguous, will be referred to as non-sequential data. In contrast, serial data because it is recorded in, and retrieved from, areas of the disk which are contiguous will be referred to as sequential data.

The above mentioned random data recording area 11 is placed at an inner circumference of a disk, while the serial data recording area 12 at an outer circumference of a disk. The reason why the serial data recording area 12 is placed at an outer circumference of a disk is that in general the higher data transmission speed is requested with respect to serial data than with random data, and that in ZCAV disk 10 the speed of data transmission is higher at an outer circumference.

The random data recording area 11 is consisting of a rewritable random data recording area 13 and a pre-pit recorded read-only random data recording area 14; the read-only random data recording area 14 is placed in an inner circumference. The serial data recording area 12 is consisting of a rewritable serial data recording area 15 and a pre-pit recorded read-only serial data recording area 16; the read-only serial data recording area 16 is placed at an outer circumference of a disk.

In the first embodiment, the data for which a faster transmission rate is required are placed at an outer circumference taking advantage of a fact that the transmission rate is higher in zones placed at outer circumference because of the higher clock frequency given to the outer zones. This area allocation is just an exemplary one; the area allocation may be decided taking the contents of information to be recorded into account.

When conducting the logic formatting, the boundary between the above mentioned recording areas 13–16 may be placed corresponding with, for example, physical boundary of the ZCAV disk 10.

The random data recording area 11 is set to a logic format in line with the logic specification of a computer or a host system on which the disk is used; and the serial data recording area 12 is set to a specific logic format (e.g. CD-ROM logic format), not in accordance with the logic specification of a computer or a host system on which the disk is used.

The non-sequential data sent by the computer or host system, although transmitted as a sequence of data, is stored on the disk at non-sequential locations. Retrieval of this data from the non-sequential locations results in the same data sequence as was sent by the host system. On the other hand, the sequential data sent by the computer or host system is transmitted to, stored on, and retrieved from, the disk as a block of contiguous data.

Furthermore, at specified locations on a same surface of disk 10, for example the innermost circumference and the outermost circumference of a disk, logic format definition areas 17, 18 for recording a logic format definition information to allocate the random data recording area 11 and the serial data recording area 12 on a disk surface is provided. The logic format definition areas may be placed together at one of the locations either at the innermost circumference or the outermost circumference of a disk.

In the above mentioned logic format definition area (also called as disk control area) 17, 18, an error sector control information, a track information in the serial data recording area 12 and other information are also recorded together, in addition to the above mentioned logic format of disk 10. Namely, the logic format definition area 17, 18 is divided into a disk structure control sector, an error list control sector, an initial defect list, a secondary defect list, a track information, etc.

The disk 10 has an address recorded continuously from the outer circumference to the inner circumference of a disk, and the random data recording area 11 and the serial data recording area 12 share a same physical address structure, sector structure and physical format; there is no physical distinction between the random data recording area 11 and the serial data recording area 12. An area is divided into random data recording area 11 and serial data recording area 12 by the logic format processing conducted at the beginning when a disk is put on service. The place of division at which the random data recording area 11 and the serial data recording area 12 are separated may be decided at free choice by the logic formatting with the physical zone boundary of a ZCAV disk 10 as a yardstick.

In the practical optical disks, this type of constitution can be applied to both types of tracks, the spiral track and the concentric circle track, and to both types of the spiral tracks, spiraling from the outer circumference to the inner circumference and from the inner circumference to the outer circumference.

The disk 10 has been described as a one the address of which continues from the outer circumference to the inner circumference of a disk, however the same effects are obtainable when the disk 10 is constituted as a one which has a continuous address recorded from the inner circumference to the outer circumference.

Figure 2:
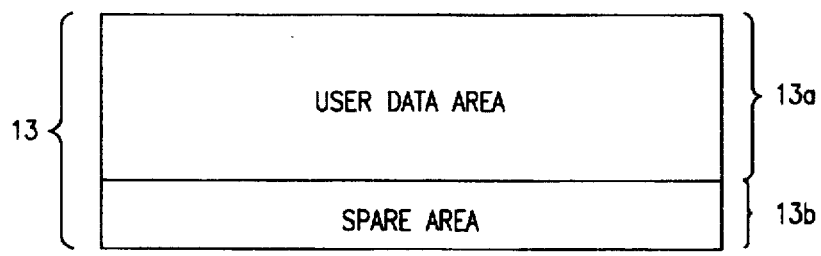
FIG. 2 Conceptual drawing showing the structure of rewritable random data recording area according to a first embodiment and a third embodiment of the present invention.

The rewritable random data recording area 13 in random data recording area 11 is divided in accordance with the unit of physical zone of the disk 10, into a user data area 13a consisting of a number of sectors and a spare area 13b consisting of a number of spare sectors, within one physical zone, as shown in FIG. 2. The spare area 13b is placed in a place separated from the user data area 13a. In FIG. 2, the spare area 13b is placed at a space inner of the user data area 13a, however, the opposit placing is possible, and it is also possible dividing the spare area 13b into two to be placed next to the inner circumference and the outer circumference of the user data area 13a.

Figure 3:
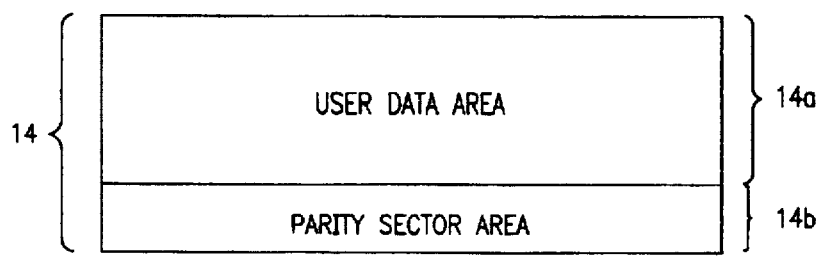
FIG. 3 Conceptual drawing showing the structure of read-only random data recording area according to a first embodiment and a third embodiment of the present invention.

Likewise, the read-only random data recording area 14 is divided in accordance with the unit of physical zone of the disk 10, into a user data area 14a consisting of a number of sectors and a parity sector area 14b consisting of a number of parity sectors, within one physical zone, as shown in FIG. 3. The parity sector area 14b is placed in a place separated from the user data area 14a. In FIG. 3, the parity sector area 14b is placed at a space inner of the user data area 14a, however, the opposit placing is possible, and it is also possible dividing the parity sector area 14b into two to be placed next to the inner circumference and the outer circumference of the user data area 14a.

The serial data recording area 12 is an area to write/read data, like picture and sound, wherein continuous writing/reading at a constant transmission speed is valued. Therefore, in the serial data recording area 12, instead of replacing an error during data recording as conducted in the rewritable random data recording area 13, a parity sector is placed during data recording immediately after a number of sectors, for example one parity sector is added after 25 sectors so that one possible error for 25 sectors may be cured. The parity sector is read out while data are being reproduced; if there are error sectors not correctable by the error correction function contained in the corresponding 25 sectors the parity sector cures an error of one sector. The above mentioned number of sectors may be decided taking the failure rate of a medium, the rate of transfer needed for the data to be recorded and the rate of allowable error in a serial data into consideration; for example, even among the picture information, if what is required is just to able to recognize a situation like the case of a surveillance camera, one parity sector for 50 sectors may be acceptable because of the high allowance rate for error, whereas among the sound information, the transfer rate of which is relatively low one parity sector may be placed for 10 sectors to reproduce a quality sound recorded. The ratio of parity sector may be determined depending on each of the media, or on each of the information recorded on a same medium. Said parity sector ratio is realized by recording the kind of corresponding program, address, and an information for deciding the number of parity sectors combined, in the logic format definition area 17, 18, as shown in FIG. 1.

Also with respect to the read-only random data recording area 14, instead of gathering plural parity sectors in one place, one parity sector may be added for every 25 sectors, for example, to be placed scattered on disk 10, in a same manner as in the serial data recording area 12.

Although FIG. 1, describes a situation that all the rewritable random data recording area 13, read-only random data recording area 14, rewritable serial data recording area 15, and read-only serial data recording area 16 exist on disk 10, the existence of all of said four recording areas on disk 10 is not essential, but either one or more than two of the four may exist.

In an information recording medium according to this embodiment, the random data recording area 11 for recording random data and the serial data recording area 12 for recording serial data are provided on a same surface of disk 10, therefore the deterioration of performance that should arise when recording random data on a conventional medium which is suitable to record serial data or when recording serial data on a recording medium which is suitable to record random data is prevented, and the continuity of data is maintained by providing serial data with a recording form that is suitable to serial data and the search time is shortened by providing random data with a recording form that is suitable to random data, furthermore data of two different types are implemented simultaneously on a same disk 10; thereby the medium is ideal for the multimedia environment where the random data and the serial data exist mixed.

The serial data recording area 12 is placed on an outer circumference of ZCAV disk 10 where a high speed data transmission is implementable, which makes it easy to secure the real time performance and or the continuity in the write/read processing of the serial data for which a higher speed data transmission is requested.

In a case where the random data recording area 11 is consisting of rewritable random data recording are 13 and read-only random data recording area 14, the read-only random data recording area 14 is placed at an inner circumference of a disk and the rewritable random data recording area 13 at the outer circumference of a disk. This helps implement a faster read out of an information for searching information recorded in the read-only random data recording area 14, and data in the rewritable random data recording area 13 where an information for starting a computer or a host system to be connected is recorded; thus a rapid start up of a computer or a host system is insured.

In a case where the serial data recording area 12 is consisting of rewritable serial data recording area 15 and read-only serial data recording area 16, the read-only serial data recording area 16 is placed at an outer circumference of a disk; therefore the rate of data transmission of the read-only serial data recording area 16 is higher and picture, sound and other serial data already recorded in disk 10 can be quickly read out.

The random data recording area 11 is set to the logic format in line with the logic specification of a computer or a host system on which the medium is used; and the serial data recording area 12 is set to a specific logic format, not in accordance with the logic specification of a computer or a host system. Therefore, the compliance to various computers and host systems having different operation systems of their own can be realized by modifying only the logic format of random data recording area 11, without necessitating the modification of the logic format of serial data recording area 12, which means that the development to various other computers and host systems turns out to be easy using a same serial data.

The format definition area(s) 17, 18 for recording the format definition information is provided on a disk surface, therefore the random data recording area 11 and the serial data recording area 12 may be allocated at free choice by the format definition information, and the allocation between the random data recording area 11 and the serial data recording area 12 can be changed by modifying the format definition information.

The format definition area(s) 17, 18 is placed in at least one of the places either at the outermost circumference or the innermost circumference of the disk 10; therefore the format definition information which is needed at the time when a disk is started can be searched promptly, and the write/read processing of data can be simplified as the format definition information, the serial data and the random data do not exist mixed.

The disk 10 is constituted to have a continuous address recorded from the outer circumference to the inner circumference of a disk, and the random data recording area 11 and the serial data recording area 12 share a same physical address structure, sector structure and physical format. An area is divided into a random data recording area 11 and a serial data recording area 12 by the logic formatting conducted at the beginning when a disk is put on service, therefore one disk surface can be divided at free choice into a random data recording area 11 and a serial data recording area 12; which means that disks 10 of a same type may be used in various area proportions by only modifying the logic format processing.

The rewritable random data recording area 13 is provided with a spare area in a place apart from the user data area, while the serial data recording area 12 and the read-only random data recording area 14 are provided with a parity sector after a certain number of sectors; therefore with respect to the rewritable random data recording area 13, an error sector is detected during recording or by the verify operation and the error sector undergoes the error replacement process where the error sector is replaced utilizing a spare sector placed in a place apart from the error sector, whereas with respect to the serial data recording area 12 and the read-only random data recording area 14, an error sector undergoes the error recovery process, at the time of reading, by making use of a parity sector placed immediately after a certain number of sectors on disk 10, thus the random data are assured with their reliability, while the serial data are secured with their continuity.

Next, a second embodiment of the present invention is described based on the illustrations shown in FIGS. 6 through 9.

Figure 6:
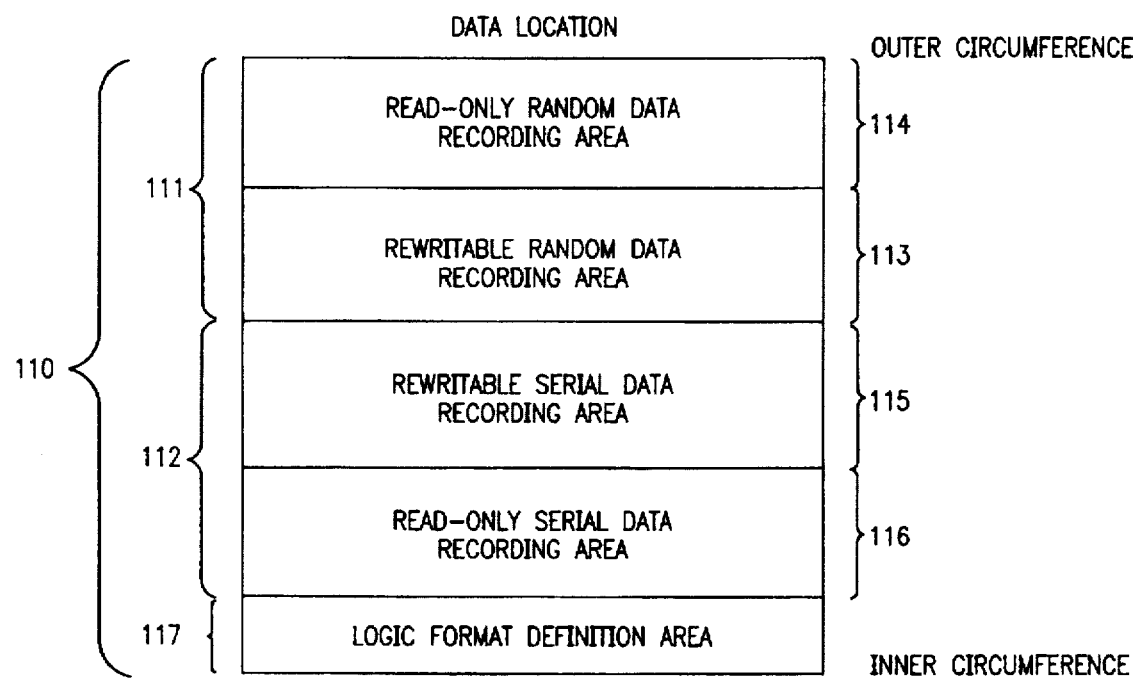
FIG. 6 Conceptual drawing showing the allocation of serial data and random data on information recording medium according to a second embodiment and a fourth embodiment of the present invention.

FIG. 6 is the counterpart for FIG. 1, which shows the first embodiment. A typical information positioning in the direction of radius on an opto-magnetic disk, phase change type optical disk, etc. driven by the zoned constant angular velocity (ZCAV) method is illustrated in FIG. 6; the bottom part corresponds to the inner circumference of a disk while the top part corresponds to the outer circumference.

As shown in FIG. 6, this information recording medium logically defines a random data recording area 111 for recording random data like a computer data with which the random access performance is important and a serial data recording area 112 for recording serial data like picture/ sound with which the real time performance and or the continuity is required on a same surface of disk 110. The difference from the first embodiment lies in the reversed positioning of inner/outer circumference.

The above mentioned random data recording area 111 is placed at an outer circumference, whereas the serial data recording area at an inner circumference. The reason why the random data recording area 111 is placed at an outer circumference of a disk is that the supposed data mixture in this embodiment is a sound information as serial data and a picture information like computer graphics as random data; where the high speed is valued more in random data than in serial data. The ZCAV disk 110 conducts the higher speed data transmission at its outer circumference.

The random data recording area 111 is consisting of a rewritable random data recording area 113 and a pre-pit recorded read-only random data recording area 114, wherein the read-only random data recording area 114 is placed at an outer circumference of a disk. The serial data recording area 112 is consisting of a rewritable serial data recording area 115 and a pre-pit recorded read-only serial data recording area 116, wherein the read-only serial data recording area 116 is placed at an inner circumference of a disk.

When conducting the logic formatting, the boundary between the above mentioned recording areas 113–116 may be placed corresponding with, for example, physical boundary of ZCAV disk 110.

The random data recording area 111 is set to a logic format in line with the logic specification of a computer or a host system on which the medium is used; while the serial data recording area 112 is set to a specific logic format (e.g. CD-ROM logic format), not in accordance with the logic specification of a computer or a host system.

Furthermore, at a specified place on a same surface of disk 110, for example at the innermost circumference of a disk, the logic format definition area 117 which records a logic format difinition information for allocating the random data recording area 111 and the serial data recording area 112 on a disk surface is placed. The logic format definition area may also be placed in both at the innermost circumference and the outermost circumference of a disk, like the case with the first embodiment.

In the above mentioned logic format definition area (also called as disk control area) 117, an error sector control infomation, and a track information in the serial data recording area 112 are also recorded together in addition to the above mentioned logic format of disk 110. Namely, the logic format definition area 117 is divided into a disk structure control sector, an error list control sector, an initial defect list, a secondary defect list, a track information, etc.

The disk 110 has an address recorded continuously from the inner circumference to the outer circumference of a disk, and the random data recording area 111 and the serial data recording area 112 share a same physical address structure, sector structure and physical format, and there is no physical distinction between the random data recording area 111 and the serial data recording area 112; an area is divided into a random data recording area 111 and a serial data recording area 112 by the logic format processing conducted at the beginning when a disk is put on service. The place of division at which random data recording area 111 and serial data recording are 112 are separated may be decided at free choice by the logic formatting, with the physical zone boundary of ZCAV disk 110 as a yardstick.

In the practical optical disks, this type of constitution can be applied to both track types, the spiral track and the concentric circle track, and to both of the spiral tracks, spriraling from the inner circumference to the outer circumference and from the outer circumference to the inner circumference.

The disk 110 has been described as a one the address of which continues from the inner circumference to the outer circumference of a disk, however the same effects are obtainable when the disk 110 is constituted as a one which has a continuous address recorded from the outer circumference to the inner circumference.

Figure 7:
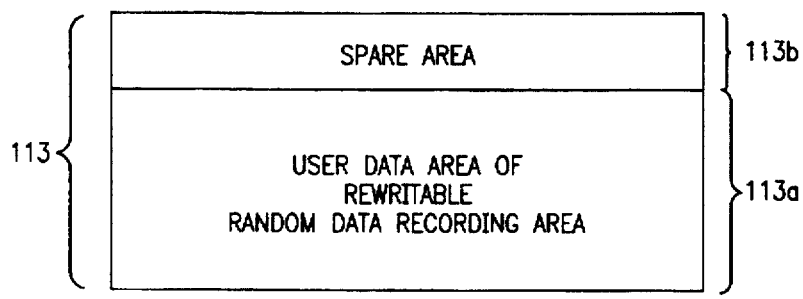
FIG. 7 Conceptual drawing showing the structure of rewritable random data recording area according to a second embodiment and a fourth embodiment of the present invention.

The rewritable random data recording area 113 in the random data recording area 111 is divided in accordance with the unit of physical zone of the disk 110, into a user data area 113a consisting of a number of sectors and a spare area 113b consisting of a number of spare sectors, within one physical zone, as shown in FIG. 7. The spare area 113b is placed at a space outer of the user data area 113a; however, the opposit placing is possible, and it is also possible dividing the spare area 113b into two to be placed next to the inner circumference and the outer circumference of the user data area 113a.

Figure 8:
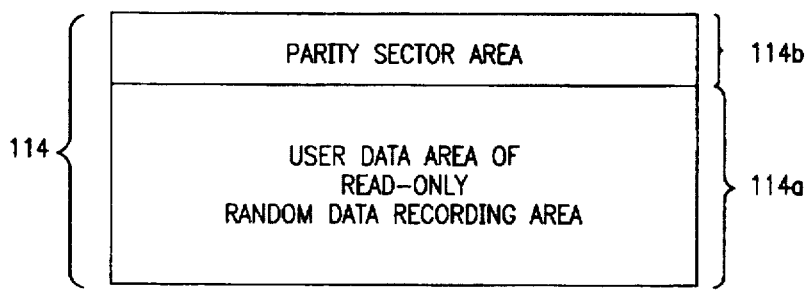
FIG. 8 Conceptual drawing showing the structure of read-only random data recording area according to a second embodiment and a fourth embodiment of the present invention.

Likewise, the read-only random data recording area 114 is divided in accordnace with the unit of physical zone of the disk 110, into a user data area 114a consisting of a number of sectors and a parity sector area 114b consisting of a number of parity sectors, within one physical zone, as shown in FIG. 8. The parity sector area 114b is placed in a place separated from the user data area 114a. In FIG. 8, the parity sector area 114b is placed at a space outer of the user data area 114a; however, the opposit placing is possible, and it is also possible dividing the parity sector area 114b into two to be placed next to the inner circumference and the outer circumference of the user data area 114a.

The serial data recording area 112 is an area to write/read data like picture and sound, wherein writing/reading continuously at a constant transfer speed is valued. Therefore, in the serial data recording area 112, instead of replacing an error during data recording as conducted in the rewritable random data recording area 113, a parity sector is placed during data recording immedeately after a certain number of sectors, for example a parity sector is added after 25 sectors so that one possible error sector for 25 sectors may be cured. The parity sector is read out while data are being reproduced; if there are error sectors not correctable by the error correction function contained in the corresponding 25 sectors the parity sector cures an error of one sector. The above mentioned number of sectors may be decided taking the failure rate of a medium, the rate of transfer needed for the data to be recorded and the rate of allowable error in the serial data into consideration, for example, even among the picture information if what is required is just to recognize a situatuion like the case of a surveillance camera, one parity sector for 50 sectors may be acceptable because of the high allowance rate of error, whereas among the sound information the transfer rate of which is relativley low one parity sector may be placed for 10 sectors to reproduce a quality sound recorded. The ratio of parity sector may be determined depending on each of the media, or on each of the information recorded on a same medium. Said parity sector ratio is realized by recording the kind of corresponding program, address, and the information for deciding the number of parity sectors combined, in the logic format definition area 117, as shown in FIG. 6.

Also with respect to the read-only random data recording area 114, instead of gathering plural parity sectors in one place, one parity sector may be added for e.g. every 25 sectors, to be placed scattered on disk 110, in the same manner as in the serial data recording area 112.

FIG. 6 illustrates a case where all the rewritable random data recording area 113, read-only random data recording area 114, rewritable serial data recording area 115 and read-only serial data recording area 116 exist on disk 110; however, the presence of all of said four recording areas on disk 110 is not essential, but the existence of one or more than two of the four may also be possible.

In an information recording medium according to the second embodiment of the present invention, because a random data recording area 111 for recording random data and a serial data recording area 112 for recording serial data are provided on a same surface of disk 110, the drawbacks which occur in a conventional setup when recording random data on a recording medium suitable for the recording of serial data and recording serial data on a recording medium suitable for the recording of random data are prevented, and the continuity of data is secured by furnishing serial data with a recording form suitable for the serial data, also the data search time is made shorter by furnishing random data with a recording form suitable for the random data, further these two different kinds of data are realized simultaneously on a same disk 110; thus the medium is ideal for use in a multimedia environment where the random data and the serial data exist mixed.

Further, as the medium employs a ZCAV disk 110 and the random data recording area 111 is placed in an outer circumference of disk 110 where the data transmission can be conducted at a higher speed, the writing/reading speed may be raised higher with the random data, in which the high speed transmission rate is a key requirement.

Further, in a case when the random data recording area 111 is made up of rewritable random data recording area 113 and read-only random data recording area 114, the read-only random data recording area 114 is placed at an outer circumference and the rewritable random data recording area 113 at an inner circumference of a disk; as a result, there comes no read-only random data 114, the content of which is not modifiable, intervening between the rewritable random data recording area 113 and the rewritable serial data recording area 115, which means that the allocation of the areas may be determined at free choice, enabling an efficient use of a disk. With the same reason, in a case when the serial data recording area 112 is made up of rewritable serial data recording area 115 and read-only serial data recording area 116, the read-only serial data recording area 116 is placed at an inner circumference of a disk.

Further, because the random data recording area 111 is set to a logic format in line with the logic specification of a computer or a host system on which the medium is used; while the serial data recording area 112 is set to a specific logic format, not in accordance with the logic specification of a computer or a host system, the medium can serve, when used in various computers or host systems having different operation systems, by modifying only the logic format of random data recording area 111, leaving the logic format of serial data recording area 112 unchanged; this means that it is easy to develop to various other computers and host systems using a same serial data.

Further, as the format definition area 117 for recording a format definition information is provided on a disk surface, the locationing of random data recording area 111 and serial data recording area 112 can be determined at free choice by the format definition information; the locationing of random data recording area 111 and serial data recording area 112 may be changed bymodification of the format definition information.

Further, as the format definition area 117 is placed at the innermost circumference of disk 110, access to the format definition information which is necessary at the time when to start a disk can be performed quickly; what is more, the format definition information, the serial data and the random data do not exist mixed, and the write/read processing of data can be simplified.

The disk 110 is constituted to have a continuous address recorded from the outer circumference to the inner circumference of a disk, and the random data recording area 111 and the serial data recording area 112 share a same physical address structure, sector structure and physical format. An area is divided into a random data recording area 111 and a serial data recording area 112 by the logic formatting conducted at the beginning when a disk is put on service, therefore one disk surface can be divided at free choice into the random data recording area 111 and the serial data recording area 112, which means that disks 110 of a same type may be used in various area proportions by only modifying the logic format processing.

The rewritable random data recording area 113 is provided with a spare area in a place apart from the user data area, while the serial data recording area 112 and the read-only random data recording area 114 are provided with a parity sector placed after a certain number of sectors; therefore with respect to the rewritable random data recording area 113, an error sector is detected during recording or by the verify operation and the error sector undergoes the error replacement process where the error sector is replaced utilizing a spare sector placed in a place apart from the error sector, whereas with respect to the serial data recording area 112 and the read-only random data recording area 114, an error sector undergoes the error recovery process at the time of reading by making use of a parity sector placed immediately after a certain number of sectors on disk 110, thus the random data are assured with their reliability, while the serial data are secured with their continuity.

Figure 9:
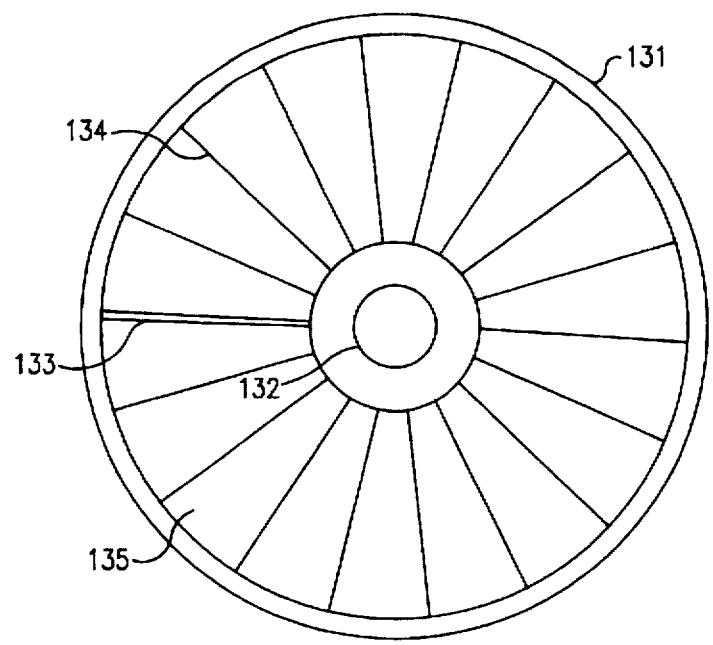
FIG. 9 Outline drawing showing typical structure of CAV disk.
Figure 10:
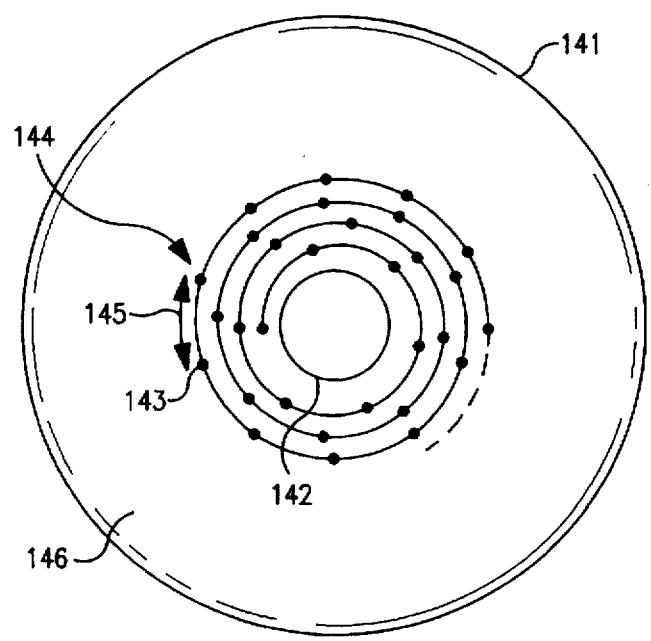
FIG. 10 Outline drawing showing typical structure of CLV disk.

In the first and the second embodiments above, examples with a ZCAV disk are described. The present invention is implementable also with the disks of other types as shown in FIGS. 9 and 10. FIG. 9 illustrates typical format of a CAV (Constant Angular Velocity) disk. Where, a disk 131 is provided with a center hole 132 for the disk to be revolved on an apparatus, and a recording area 135 for recording of information by a user is provided with a fine track(s) (not illustrated) placed spirally or in concentric circles at a pitch of about 1 micro meter for recording information, and addresses 133, 134, etc. for indicating the location and the angle of the track are pre-recorded in an off and on way of each track. In the CAV disk, the angle of each sector is made to be the same over a whole disk, therefore the speed of transfer at an outer circumference and an inner circumference remains the same, which makes the write/read processing simple and the access time faster. This means an easy handling from the view point of host computer. However, the recording density varies between an outer circumference and an inner circumference; the recording density decreases at an outer circumference. Therefore, the ZCAV system is superior with respect of the maximum utilization of a disk surface. Information is recorded within each sector as a line of pits having optical variations given by the intensity modulation of laser, etc. In FIG. 9, the number of sectors is illustrated as 18, in most practical cases the number is more.

FIG. 10 illustrates typical format of a disk called CLV (Constant Linear Velocity). Where, a disk 141 is provided with a center hole 142 for the disk to be revolved on an apparatus, a fine track(s) (not illustrated) placed spirally or in concentric circles at a pitch of about 1 micro meter as a recording area 146 for recording of information by a user, and addresses 143, 144, etc. for indicating the location and the angle of the track pre-recorded in an off and on way of each track. In this type of disks, the length of each sector is made to be equal over the whole disk, and to keep the relative speeds between an outer circumference and an inner circumference constant the number of revolutions of disk is controlled so that each of said sector length takes a same time, by lowering the revolving speed at an outer circumference while increasing the speed at an inner circumference. By so doing, the speed of transfer rate and the recording density at an outer circumference and an inner circumference are kept to be constant, which is quite an advantage in view of the maximum utilization of a disk surface; however, as the sector locationing between the adjacent tracks is uneven, the sector length varies when jumped to an adjacent track, which causes a momentary turbulence in the revolution. This brings about a difficulty in increasing the access speed. Although this is a slight drawback when used in a computer application where the high speed is an essential requirement, the capacity can be maximized on a disk of given size and track pitch. Information is recorded within each sector as a line of pits having an optical variation created by the intensity modulation of laser, etc.

The present invention is effective with each and every disk of any systems described above, for application in the field of multimedia, where the random data and the serial data are required to coexist. What is targeted may be realized by choosing an optimun disk system suitable to the nature of application, taking the features of respective systems into consideration: In a case where the high speed is a most important factor, the CAV system or the ZCAV system is suitable; where the high speed and the large capacity are required at the same time, the ZCVA system; where the capacity is to be maximized, the CLV system may be chosen.

Now in the following, an information recording method using the above information recording media is described as a third embodiment of the present invention, referring to FIGS. 1 through 4.

As shown in FIG. 1, the information recording method records the random data and the serial data separately in a random data recording area 11 and a serial data recording area 12, respectively, provided on a same surface of a disk 10.

The random data is recorded in random data recording area 11 provided at an inner circumference of a disk, while the serial data is recorded in serial data recording area 12 provided at an outer circumference of a disk.

In a case when random data recording area 11 is consisting of a rewritable random data recording area 13 and a read-only random data recording area 14, a random data which does not require the rewriting is recorded already at manufacture by pre-pit, etc. in read-only random data recording area 15 located at an inner circumference of a disk. In the same way, when serial data recording area 12 is consisting of a rewritable serial data recording area 15 and a read-only serial data recording area 16, a serial data which does not require the rewriting is recorded already at manufacture by pre-pit, etc. in read-only serial data recording area 16 located at an outer circumference of a disk.

The third embodiment as described above features in that a data which requires a faster transmission rate is placed at an outer circumference taking advantage of a fact that the transmission rate goes faster at an outer circumference in the ZCAV disk. The area allocation as described above is an exemplary nature; the area allocation may be determined based on contents of information to be recorded.

As to the logic format for writing/reading, the random data is recorded in random data recording area 11 with a logic format in accordance with the logic specification of a computer or a host system on which the data is processed, while the serial data is recorded in serial data recording area 12 in accordance with a specific logic format, not in line with the logic specification of a computer or a host system. Where, rewritable random data recording area 13 detects an error sector during recording or by the verify operation to replace the error sector utilizing a spare sector, whereas serial data recording area 12 as well as read-only random data recording area 14 execute the error recovery against an error sector during reading utilizing a parity sector placed immediately after a certain number of sectors on disk 10. The verify operation means an operation to verify if a data is correctly written in a disk by reading out a data once written in a disk and compare the same with the original data.

A logic format definition information, which defines the placement of random data recording area 11 and serial data recording area 12 on a disk surface including an information whether or not there are rewritable random data recording area 13 and read-only random data recording area 14, and their positioning, as well as whether or not there are rewritable serial data recording area 15 and read-only serial data recording area 16, and their positioning, is recorded in a specified location on a same surface of disk 10; for example, in a logic format definition area 17 or 18 located in the innermost circumference or the outermost circumference of disk 10.

When, an address continuing from the outer circumference towards the inner circumference of a disk is recorded on disk 10. Random data recording area 11 and serial data recording area 12 are provided with a same physical address structure, sector structure and physical format, wherein an area is divided into random data recording area 11 and serial data recording area 13 by the logic formatting to be conducted at the beginning when a disk is put on service.

In the above description, disk 10 is described as a one on which an address is recorded continuously from an outer circumference towards an inner circumference, however the same effects are obtainable when the address is recorded continuously from the inner towards the outer circumference.

In an information recording method according to the third embodiment of the present invention, because a random data recording area 11 for recording random data and a serial data recording area 12 for recording serial data are provided on a same surface of disk 10, the drawbacks which occur in a conventional setup when recording random data on a recording medium suitable for the recording of serial data and recording serial data on a recording medium suitable for the recording of random data are prevented, and the continuity of data is secured by furnishing serial data with a recording form suitable for the serial data, also the data search time is made shorter by furnishing random data with a recording form suitable for the random data, further these two different kinds of data are realized simultaneously on a same disk 10; thus the method is ideal for use in the multimedia environment where the random data and the serial data exist mixed.

As this method employs ZCAV disk 10 and records serial data in an outer circumference of disk 10 where the data transmission can be made at high speed, it turns out easy to secure the immediateness or the continuity in writing/reading of serial data.

Further, because the random data recording area 11 is set to a logic format in line with the logic specification of a computer or a host system on which the medium is used, while the serial data recording area 12 is set to a specific logic format, not in accordance with the logic specification of a computer or a host system, the development to other computers or host systems having different operation systems can be made easily using the same serial data, by modifying only the logic format of random data recording area 11, leaving the logic format of serial data recording area 12 unchanged.

Further, as the format definition information is recorded on a disk surface, the locationing of random data recording area 11 and serial data recording area 12 can be determined at free choice by the format definition information; the locationing of random data recording area 11 and the serial data recording area 12 may be changed by modification of the format definition information.

Further, as the format definition information is recorded in at least either one of the outermost circumference or the innermost circumference of a disk, the format definition information which is necessary at the time when to start a disk can be detected quickly; what is more, the format definition information, the serial data and the random data do not exist mixed, and the write/read processing of data can be simplified.

Further, as the rewritable random data recording area 13 detects an error sector during recording or by the verify operation and the error sector undergoes the error replacement process where the error sector is replaced utilizing a spare sector placed in a place apart from the error sector, the reliability of a recorded data is assured. In the serial data recording area 12 and the read-only random data recording area 14, an error sector undergoes the error recovery process at the time of reading by making use of a parity sector placed immediately after a certain number of sectors on disk 10, thus the continuity of data is secured.

In the above third embodiment, various information needed when using a disk, such as, whether or not each area exists, allocation position, parity ratio of serial data, etc. are recorded in the logic format definition areas 17 and 18 provided at the innermost circumference and the outermost circumference of a disk, and the existence of each area, allocation position, etc. can be changed at free choice through modification of the data recorded in logic format definition areas 17, 18. If the logic format indicating the existence or non-existence of each area and the allocation position is a fixed one, the existence or non-existence of each area and the allocation position are not needed to be recorded in the logic format definition area; instead, it is also possible to have the existence or non-existence of each area and the allocation position memorized in a personal computer, etc. which uses the information recording apparatus, and make a first hand access to them.

Next, as a fourth embodiment of the present invention, an information recording method using the above described information recording media is described referring to FIGS. 6 through 8.

As illustrated in FIG. 6, the information recording method records the random data and the serial data separately, using an information recording apparatus, in a random data recording area 111 and a serial data recording area 112, provided on a same surface of disk 110.

When, the random data is recorded in random data recording area 111 placed at an outer circumference of a disk, while the serial data is recorded in serial data recording area 112 placed at an inner circumference of a disk.

In a case when random data recording area 111 is consisting of a rewritable random data recording area 113 and a read-only random data recording area 114, a random data which does not require the rewriting is recorded already at manufacture by pre-pit, etc. in read-only random data recording area 115 located at an outer circumference of a disk. In the same way, when serial data recording area 112 is consisting of a rewritable serial data recording area 115 and a read-only serial data recording area 116, a serial data which does not require the rewriting is recorded already at manufacture by pre-pit, etc. in read-only serial data recording area 116 located at an inner circumference of a disk.

As to the logic format for writing/reading, the random data is recorded in random data recording area 111 with a logic format in accordance with the logic specification of a computer or a host system on which the data is processed, while the serial data is recorded in serial data recording area 112 in accordance with a specific logic format, not in line with the logic specification of a computer or a host system. Where, rewritable random data recording area 113 detects an error sector during recording or by the verify operation to replace the error sector utilizing a spare sector, whereas serial data recording area 112 as well as read-only random data recording area 114 execute the error recovery against an error sector during reading utilizing a parity sector placed immediately after a certain number of sectors on disk 10.

A logic format definition information, which defines the placement of random data recording area 111 and serial data recording area 112 on a disk surface including an information whether or not there are rewritable random data recording area 113 and read-only random data recording area 114, and their positioning, as well as whether or not there are rewritable serial data recording area 115 and read-only serial data recording area 116, and their positioning, is recorded in a specified location on a same surface of disk 110; for example, in a logic format definition area 117 located at the innermost circumference of disk 110.

When, an address continuing from the inner circumference towards the outer circumference of a disk is recorded on disk 110. Random data recording area 111 and serial data recording area 112 are provided with a same physical address structure, sector structure and physical format, wherein an area is divided into random data recording area 111 and serial data recording area 113 by the logic formatting conducted at the beginning when a disk is put on service.

In the above description, disk 110 is described as a one on which an address is recorded continuously from an inner circumference towards an outer circumference, however the same effects are obtainable when the address is recorded continuously from the outer towards the inner circumference.

In an information recording method according to the fourth embodiment of the present invention, because a random data recording area 111 for recording random data and a serial data recording area 112 for recording serial data are provided on a same surface of disk 110, the drawbacks which occur in a conventional setup when recording random data on a recording medium suitable for the recording of serial data and recording serial data on a recording medium suitable for the recording of random data are prevented, and the continuity of data is secured by furnishing serial data with a recording form suitable for the serial data, also the data search time is made shorter by furnishing random data with a recording form suitable for the random data, further these two different kinds of data are realized simultaneously on a same disk 110; thus the method is ideal for use in the multimedia environment where the random data and the serial data exist mixed.

Further, because the random data recording area 111 is set to a logic format in line with the logic specification of a computer or a host system on which the medium is used, while the serial data recording area 112 is set to a specific logic format, not in accordnace with the logic specification of a computer or a host system, the development to other computers or host systems having different operation systems can be made easily using the same serial data by modifying only the logic format of random data recording area 111, leaving the logic format of serial data recording area 112 unchanged.

Further, as the format definition information is recorded on a disk surface, the locationing of random data recording area 111 and serial data recording area 112 can be determined at free choice by the format definition information; the locationing of random data recording area 111 and the serial data recording area 112 may be changed by modification of the format definition information.

Further, as the format definition information is recorded in at least either one of the outermost circumference or the innermost circumference of a disk, the format definition information which is necessary at the time when to start a disk can be detected quickly; what is more, the format definition information, the serial data and the random data do not exist mixed, and the write/read processing of data can be simplified.

Further, as the rewritable random data recording area 113 detects an error sector during recording or by the verify operation and the error sector undergoes the error replacement process where the error sector is replaced utilizing a spare sector placed in a place apart from the error sector, the reliability of a recorded data is assured. In the serial data recording area 112 and the read-only random data recording area 114, an error sector undergoes the error recovery process at the time of reading by making use of a parity sector placed immediately after a certain number of sectors on disk 110, thus the continuity of data is secured.

In the fourth embodiment above, various information needed when using a disk, such as, whether or not each area exists, allocation position, parity ratio of serial data, etc. are recorded in the logic format definition area 117 provided at the innermost and the outermost circumferences of a disk; and the existence or non-existence of each area, allocation position, etc. can be changed at free choice through modification of the data recorded in logic format difinition area 117. If the logic format specifying the existence or non-existence of each area and the allocation position is a fixed one, the existence or non-existence of each area and the allocation position are not needed to be recorded in the logic format definition area; instead, it is also possible to have the existence or non-existence of each area and the allocation position memorized in a personal computer, etc. which uses the information recording apparatus, and make a first hand access to the memorized.

Figure 4:
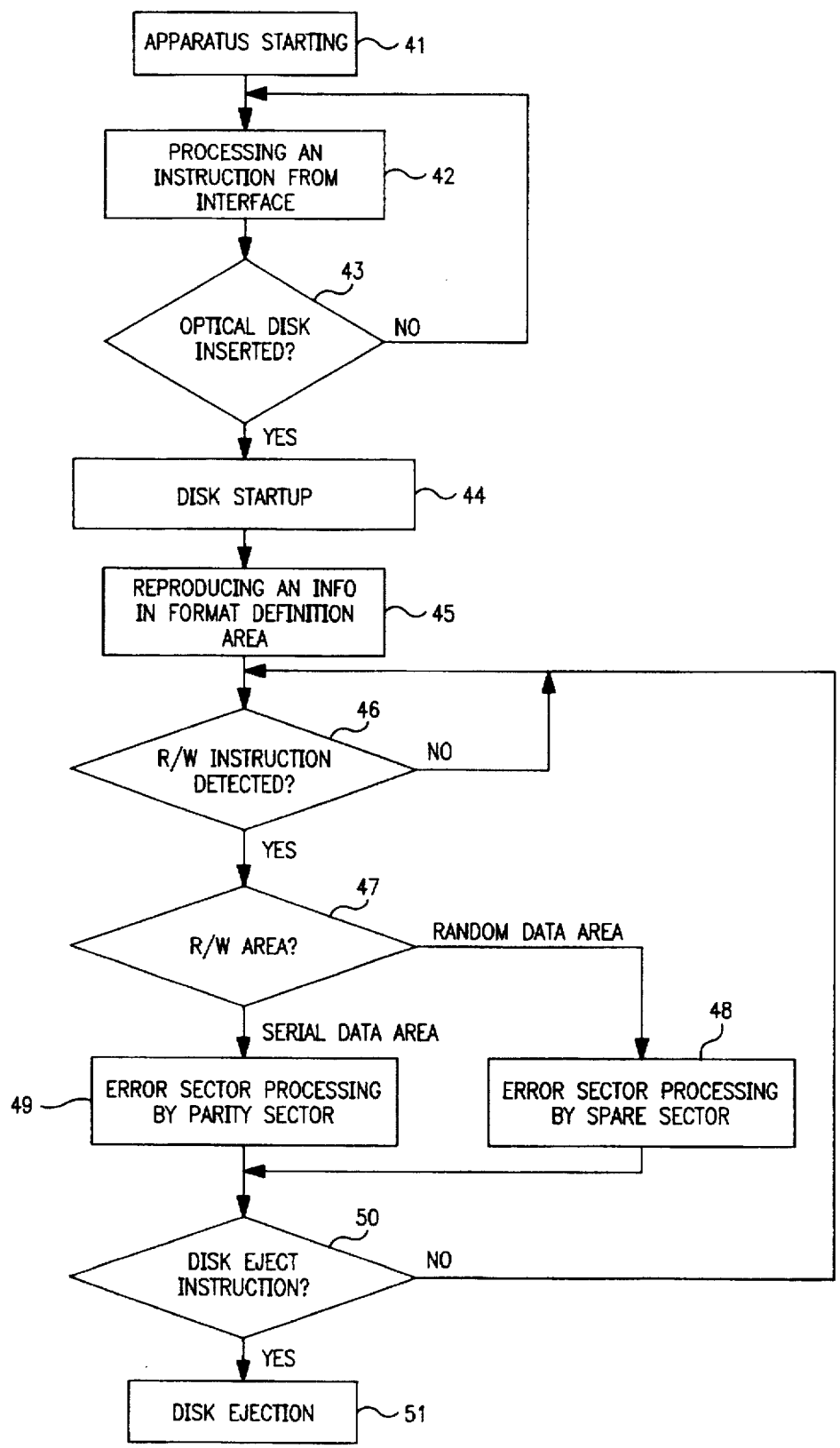
FIG. 4 Flow chart showing the operation of an information recording apparatus according to a fifth embodiment of the present invention.

Now in the following, as a fifth embodiment of the present invention, the process flow in an information recording apparatus executing the above information recording method is described referring to flow chart shown in FIG. 4.

The information recording apparatus conducts in the first place an apparatus starting process, as step 41. Then, after processing an instruction from interface as step 42, judges if an optical disk is inserted in optical disk apparatus as step 43; in case non insertion, returns to step 42, the processing of instruction from interface.

If an optical disk is inserted in optical disk apparatus, a disk startup process is conducted as step 44, and as step 45 an information in the format definition area on disk is reproduced.

Next, as step 46, whether or not an instruction to read or an instruction to write (R/W instruction) arrived is judged. If there is an instuction to read or an instruction to write arrived, step 47 judges if an access area (R/W area) as specified by the instruction to read or the instruction to write is a random data recording area (rewritable type only) or a serial data recording area (including read-only random data recording area); if it is random data recording area, step 48 conducts the error sector processing utilizing a spare sector, if it is serial data recording area, step 49 conducts the error sector processing by parity sector.

And then, step 50 judges whether or not an instruction to eject a disk arrived; until the instruction to eject a disk arrives, processes after the step 46, viz. the processes after an instruction to read or an instruction to write is detected are repeated. As soon as an instruction to eject a disk arrives, step 51 ejects the disk.

The function-wise representation of the above processing shown in the flow chart is as follows. The information recording apparatus in issue comprises an apparatus starting means for conducting an apparatus starting process, an interface instruction processing means for processing an instruction from interface, a disk insertion detecting means for detecting a disk inserted in an optical disk apparatus, a disk startup processing means for conducting a disk startup process in response to an output from the disk insertion detecting means, a format definition information reproducing means for reproducing an information in a format definition area on a disk, a read/write instruction detection means for detecting a read/write instruction, a read/write area judging means for judging, based on an address contained in a read/write instruction detected by the read/write instruction detection means and an information in the format definition area on a disk, if a read/write area is a rewritable random data area or other data area, an error sector handling means for conducting, based on an output from the read/write area judging means, the error sector processing utilizing a spare sector when the read/write area is a rewritable random data area, or the error sector processing by the parity sector when the read/write area is an area other than rewritable random data area, and a disk ejection means for ejecting a disk out of an optical disk apparatus upon detecting an instruction to eject a disk.

Although the above embodiments are described employing exemplary cases with an opto-magnetic disk and a phase change type optical disk, it is needless to mention that the present invention is applicable to other optical recording systems which make use of a pigment modification type recording material and other recording materials, as well as to other recording media and apparatus based on other recording principles such as magnetic recording, mechanical recording, etc.

Furthermore, an information recording apparatus according to the present invention is effective not only with a recording apparatus but also effective with an apparatus dedicated solely for reproduction of a medium recorded in a same recording format.

The features of the above described information recording medium, information recording method and information recording apparatus for realizing the recording method according to the present invention, as well as the effects therefrom, are as follows.

First, as a random data recording area for recording random data and a serial data recording area for recording serial data are provided on a same surface of a disk, the drawbacks which occur in a conventional setup when recording random data on a recording medium suitable for the recording of serial data and recording serial data on a recording medium suitable for the recording of random data are prevented, and the continuity of data is secured by furnishing serial data with a recording form suitable for the serial data, also the data search time is made shorter by furnishing random data with a recording form suitable for the random data, further these two different kinds of data are realized simultaneously on a same disk; thus the invention is ideal for use in the multimedia environment where the random data and the serial data exist mixed.

Next, as the serial data recording area is placed in an outer circumference of a ZCAV disk, where the data transmission can be made at a higher speed, it turns out easy to secure the immediateness or the continuity in writing/reading of serial data, with which a higher speed transmission rate is an essential requirement.

In a ZCAV disk, it is also possible to realize the processing of random data at a higher speed by placing the random data recording area at an outer circumference of a disk, securing the continuity of serial data at the same time.

Also in systems other than the ZCAV, it is possible to realize at the same time the use of random data in the same way as before and the continuity of serial data, by placing the random data recording area and the seraial data recording area separated at an inner circumference and at an outer circumference.

Further, by placing read-only random data recording area at an inner circumference in a case where a random data recording area is consisting of rewritable random data recording area and read-only random data recording area, data for detecting an information which is recorded in the random data recording area placed at an outer circumference can be searched at a faster speed, and the access to read-only random data recording area is conducted at a faster speed, and computer data and other random data pre-recorded in a disk can be read out at a faster speed; thereby the startup of computer or host system can be made faster. Other effects include that, as a read-only serial data is never placed intervening between the random data and the serial data, the area allocation between the random data and serial data may be determined at free choice, enabling the efficient use of disks in various applications.

Further, by placing read-only serial data recording area at an outer circumference in a case where a serial data recording area is consisting of rewritable serial data recording area and read-only serial data recording area, the data transmission rate of the read-only serial data recording area goes faster, making the read out of picture, sound and other serial data pre-recorded in a disk faster. Other effects include that, as a read-only random data is never placed intervening between the random data and the serial data, the area allocation between the random data and the serial data may be determined at free choice, enabling the efficient use of disks in various applications.

Further, because the random data recording area is set to a logic format in line with the logic specification of a computer or a host system, while the serial data recording area is set to a specific logic format, not in accordance with the logic specification of a computer or a host system, the development to other computers or host systems having different operation systems can be made easily using the same serial data, by modifying only the logic format of random data recording area, leaving the logic format of serial data recording area unchanged.

Further, by providing a format definition area for recording format definition information on a disk surface, the locationing of the random data recording area and the serial data recording area can be determined at free choice by the format definition information; the locationing of the random data recording area and the serial data recording area may be changed by the modification of format definition information.

Further, by providing a format definition area in at least either one of the outermost circumference or the innermost circumference of a disk, a format definition information which is needed when starting up a disk is quickly detected; and the format definition information, serial data and random data do not exist mixed, rendering the write/read processing of data simplified.

Further, disk is constituted to have a continuous address recorded from the outer circumference to the inner circumference of a disk, and the random data recording area and the serial data recording area have a same physical address structure, sector structure and phsysical fromat. An area is divided into a random data recording area and a serial data recording area by the logic fomatting conducted at the beginning when a disk is put on service, therefore one disk surface can be divided at free choice into a random data recording area and a serial data recording area, which means that disks of a same type may be used in various area proportions by only modifying the logic format processing.

Further, the rewritable random data recording area is provided with a spare area in a place apart from the user data area, while the serial data recording area and the read-only random data recording area are provided with a parity sector placed after a specific number of sectors; therefore with respect to the random data recording area, an error sector is detected during recording or by the verify operation and the error sector undergoes the error replacement process where the error sector is replaced utilizing a spare sector placed in a place apart from the error sector, whereas with respect to the serial data recording area and the read-only random data recording area, an error sector undergoes the error recovery process at the time of reading by making use of a parity sector placed immediately after a certain number of sectors on a disk, thus the random data are assured with their reliability, while the serial data are secured with their continuity.

Thus, according to the present invention, the high speed processing and the continuity with respect to serial data, the reliability and the high speed processing with respect to random data, the capacity and the response required by a host computer, and other required factors are implementable through integration of specific effects brought about from each of the above described constitutions, various recording systems such as CAV, CLV disks, and disks having continuous address recorded from the inner towards the outer circumference of disk; thereby offers information recording media, information recording methods and information recording apparatus ideal for use in the multimedia environment where the random data and the serial data exist mixed.

Various alterations and modifications will no doubt become apparent to those skilled in the art after having read the preferred embodiments of the present invention described above. It is to be understood that the disclosures made in the preferred embodiments are not to be interpreted as limiting. Accordingly, it is intended that the appended claims be interpreted as covering all alterations and modifications as fall within the true spirit and scope of the invention.

What is claimed is:

1. An information recording disk medium comprising:
    a random data recording area on a surface of the information recording disk medium for recording non-sequential data,
    a serial data recording area on the same surface of the information recording disk medium for recording sequential data,
    wherein the disk is a zoned constant angular velocity disk, where the disk is revolved at constant revolutions; the disk surface is split in the direction of radius into plural zones, wherein the number of sectors is kept constant within a first zone and the number of sectors increases in a second zone located at an outer circumference relative to the first zone, and
    the random data recording area is placed at an inner circumference of the disk, while the serial data recording area is placed at an outer circumference of the disk.

2. An information recording medium according to claim 1, wherein
    the random data recording area is comprising a rewritable random data recording area and a read-only random data recording area, and the read-only random data recording area is placed at an inner circumference of a disk.

3. An information recording medium according to claim 1, wherein
    the serial data recording area is comprising a rewritable serial data recording area and a read-only serial data recording area, and the read-only serial data recording area is placed at an outer circumference of a disk.

4. An information recording disk medium comprising:
    a random data recording area on a surface of the information recording disk medium for recording non-sequential data,
    a serial data recording area on the same surface of the information recording disk medium for recording sequential data,
    a format definition area for recording format definition information which regulates the allocation of random data recording area and serial data recording area on a disk surface is placed in a specific location on said disk surface.

5. An information recording medium according to claim 3, wherein
    a format definition area for recording format definition information which regulates the allocation of random data recording area and serial data recording area on a disk surface is placed in a specific location on said disk surface.

6. An information recording disk medium comprising:
    a random data recording area on a surface of the information recording disk medium for recording non-sequential data,
    a serial data recording area on the same surface of the information recording disk medium for recording sequential data,
    the random data recording area is set to a logic format in line with the logic specification of a computer or a host system on which the system is used, while the serial data recording area is set to a specific logic format, not in line with the logic specification of said computer or said host system,
    a format definition area for recording format definition information which regulates the allocation of random data recording area and serial data recording area on a disk surface is placed in a specific location on said disk surface.

7. An information recording medium according to claim 4, wherein
the specific location on disk surface for placing format definition area is at least one of the locations either at the outermost circumference or the innermost circumference of said disk surface.

8. An information recording disk medium comprising:
a random data recording area on a surface of the information recording disk medium for recording non-sequential data,
a serial data recording area on the same surface of the information recording disk medium for recording sequential data,
the disk is provided with address continuously recorded starting from the outer circumference towards the inner circumference of a disk,
the random data recording area and the serial data recording area are provided with a same physical address structure, sector structure and physical format, and
an area is divided into said random data recording area and serial data recording area by logic formatting conducted at the beginning when a disk is put on service.

9. An information recording disk medium comprising:
a random data recording area on a surface of the information recording disk medium for recording non-sequential data,
a serial data recording area on the same surface of the information recording disk medium for recording sequential data,
wherein the rewritable random data recording area of the random data recording area is provided with a spare area in an area other than user data area, while the serial data recording area and the read-only random data recording area of said random data recording area are provided with a parity sector immediately after every certain number of sectors.

10. An information recording medium according to claim 9, wherein
the random data recording area is set to a logic format in line with the logic specification of a computer or a host system on which the medium is used, while the serial data recording area is set to a specific logic format, not in line with the logic specification of said computer or said host system.

11. An information recording medium according to claim 10, wherein
a format definition area for recording format definition information which regulates the allocation of random data recording area and serial data recording area on a disk surface is placed in a specific location on said disk surface.

12. An information recording medium according to claim 11, wherein
the specific location on a disk surface for placing the format definition area is at least one of the locations either at the outermost circumference or the innermost circumference of said disk surface.

13. An information recording medium according to claim 12, wherein
the random data recording area is placed in an inner circumference of a disk, while the serial data recording area is placed in an outer circumference of a disk.

14. An information recording medium according to claim 13, wherein
the random data recording area is comprising a rewritable random data recording area and a read-only random data recording area, and the read-only random data recording area is placed at an inner circumference of a disk.

15. An information recording medium according to claim 13, wherein
the serial data recording area is comprising a rewritable serial data recording area and a read-only serial data recording area, and the read-only serial data recording area is placed at an outer circumference of a disk.

16. An information recording medium according to claim 13, wherein
the disk is provided with address continuously recorded starting from the outer circumference towards the inner circumference of a disk,
the random data recording area and the serial data recording area are provided with a same physical address structure, sector structure and physical format, and
an area is divided into said random data recording area and said serial data recording area by logic formatting conducted at the beginning when a disk is put on service.

17. An information recording medium according to claim 13, wherein
the disk is a zoned constant angular velocity disk.

18. An information recording medium according to claim 12, wherein
the random data recording area is placed at an outer circumference of a disk, while the serial data recording area is placed at an inner circumference of a disk.

19. An information recording medium according to claim 18, wherein
the random data recording area is comprising a rewritable random data recording area and a read-only random data recording area, and the read-only random data recording area is placed at an outer circumference of a disk.

20. An information recording medium according to claim 18, wherein
the serial data recording area is comprising a rewritable serial data recording area and a read-only serial data recording area, and the read-only serial data recording area is placed at an inner circumference of a disk.

21. An information recording medium according to claim 18, wherein
the disk is provided with address continuously recorded starting from the inner circumference towards the outer circumference of a disk,
the random data recording area and the serial data recording area are provided with a same physical address structure, sector structure and physical format, and
an area is divided into said random data recording area and said serial data recording area by logic formatting conducted at the beginning when a disk is put on service.

22. An information recording medium according to claim 18, wherein
the disk is a zoned constant angular velocity disk.

23. An information recording method for use with an information recording disk medium, comprising the steps of:
(a) recording random data in an inner circumference of the information recording disk medium, the information recording disk medium being a zoned constant angular velocity disk, (b) recording serial data in an outer circumference of the information recording disk medium, said random data being recorded on a same surface of the information recording medium as said serial data.

24. An information recording method for use with an information recording disk medium, comprising the steps of:

(a) recording random data in an inner circumference of the information recording disk medium, the information recording disk medium being a zoned constant angular velocity disk, (b) recording serial data in an outer circumference of the information recording disk medium, said random data being recorded on a same surface of the information recording medium as said serial data, regulating the allocation of a random data recording area and a serial data recording area on a disk surface by recording format definition information in a specific location on said disk surface.

25. An information recording method according to claim 24 wherein the specific location on disk surface for recording format definition information is at least one of the locations either at the outermost circumference or the innermost circumference of said disk surface.

26. An information recording method for use with a information recording disk medium, comprising the steps of:

(a) recording random data in a first area of the information recording disk medium, (b) recording serial data in a second area of the information recording disk medium, said second area being on a same surface of the information recording medium as said first area, (c) detecting an error sector during one of a recording and a verifying operation in a rewritable random data recording area of the first area, and replacing the error sector with a spare sector in a location separated from the error sector;

(d) detecting an error sector while reading from one of the second area and a read-only random data recording area of the first area, and utilizing a parody sector placed immediately after a certain number of sectors on a disk.

27. An information recording method according to claim 26, wherein random data are recorded in accordance with a logic format which is in line with the logic specification of a computer or a host system to be used, while the serial data are recorded in accordance with a specific logic, not in line with the logic specification of said computer or said host system.

28. An information recording method according to claim 27, wherein a format definition information for regulating the allocation of random data recording area and serial data recording area on a disk surface is recorded in a specific location on said disk surface.

29. An information recording method according to claim 28, wherein the specific location on disk surface for recording format definition information is at least one of the locations either at the outermost circumference or the innermost circumference of said disk surface.

30. An information recording method according to claim 29, wherein the random data recording area is placed at an inner circumference of a disk, while the serial data recording area is placed at an outer circumference of a disk.

31. An information recording method according to claim 30, wherein the disk is a zoned constant angular velocity disk.

32. An information recording method according to claim 29, wherein the random data recording area is placed at an outer circumference of a disk, while the serial data recording area is placed at an inner circumference of a disk.

33. An information recording method according to claim 32, wherein the disk is a zoned constant angular velocity disk.

* * * * *